June 26, 1934.   J. D. LELAND   1,964,586
APPARATUS FOR DETERMINING COLOR HARMONIES
Filed Nov. 19, 1932

INVENTOR=
Joseph D. Leland
BY Geo. W. Woodworth
ATTORNEY=

Patented June 26, 1934

1,964,586

UNITED STATES PATENT OFFICE 1,964,586

APPARATUS FOR DETERMINING COLOR HARMONIES

Joseph D. Leland, Milton, Mass.

Application November 19, 1932, Serial No. 643,385

2 Claims. (Cl. 88—14)

In various arts and industries such as interior decorating, color advertising, lithograph work, the manufacture of wall papers, rugs, carpets, china, women's and children's yardage goods, flower decorations, and the like, it is necessary to select combinations of colors which when brought into proximity will produce color harmonies.

A harmonic relation exists between colors when the ratios of the frequencies of the corresponding light waves are small whole-number ratios. When colors between which a harmonic relation exists are placed close together, there results a sense of harmony, probably because such colors mutually intensify each other if the small whole numbers are not too large.

The object of my invention therefore is to provide an apparatus whereby color harmonies may be determined by a simple mechanical operation which does not involve scientific knowledge or skill on the part of the user.

My invention contemplates the use of a surface which may be annular, circular or linear and which is divided into consecutive portions each having a distinctive hue, and a multi-element indicator mounted for relative movement with respect to said surface and having its elements so related as to indicate in any given position thereof hues producing a color harmony, as above defined.

Whatever be the form of said surface, it is desirable that consecutive portions thereof have their abutting edges well defined in order to provide a marked color separation between the hues thereof.

In the preferred form of my invention the surface is annular and the multi-element indicator is rotatably mounted at the center thereof. Preferably the ring is made up of a plurality of removable sectors, the outer surface of each of which has a distinctive hue, some of said sectors having hues corresponding to the colors of the spectrum and others having hues that do not appear in the spectrum and are complementary, respectively, to the hues in a portion of the visible spectrum, for example, that portion between and including yellow-green and blue-green.

The several consecutive portions into which the surface aforesaid is divided, for example, the sectors making up said ring, may be arranged in accordance with a function of the frequencies or wave lengths of the light waves corresponding to the distinctive hues of said consecutive portions or sectors, and preferably they are arranged in accordance with a logarithmic function of said frequencies or wave lengths. The rotatable indicator preferably is a system of pointers or arrows having such angular relation that for any given position of the indicator, two or more arrows will point to hues which make up a color harmony.

The several colored sectors or consecutive portions into which said flat surface is divided preferably are numbered consecutively or provided with other indicia of light-wave frequencies. If desired, the coloring of said flat surface may be omitted and the hues making up any color harmony determined by color cards provided with indicia or numbers corresponding with those on said surface. In such case the numbers or other indicia will be spaced apart in accordance with a function of the frequencies or wave lengths of the light waves corresponding to the hues represented by said numbers or indicia and preferably in accordance with a logarithmic function of said frequencies or wave lengths.

An illustrative embodiment of the invention which has given good results in practice is shown in the accompanying drawing in which—

Figure 1:
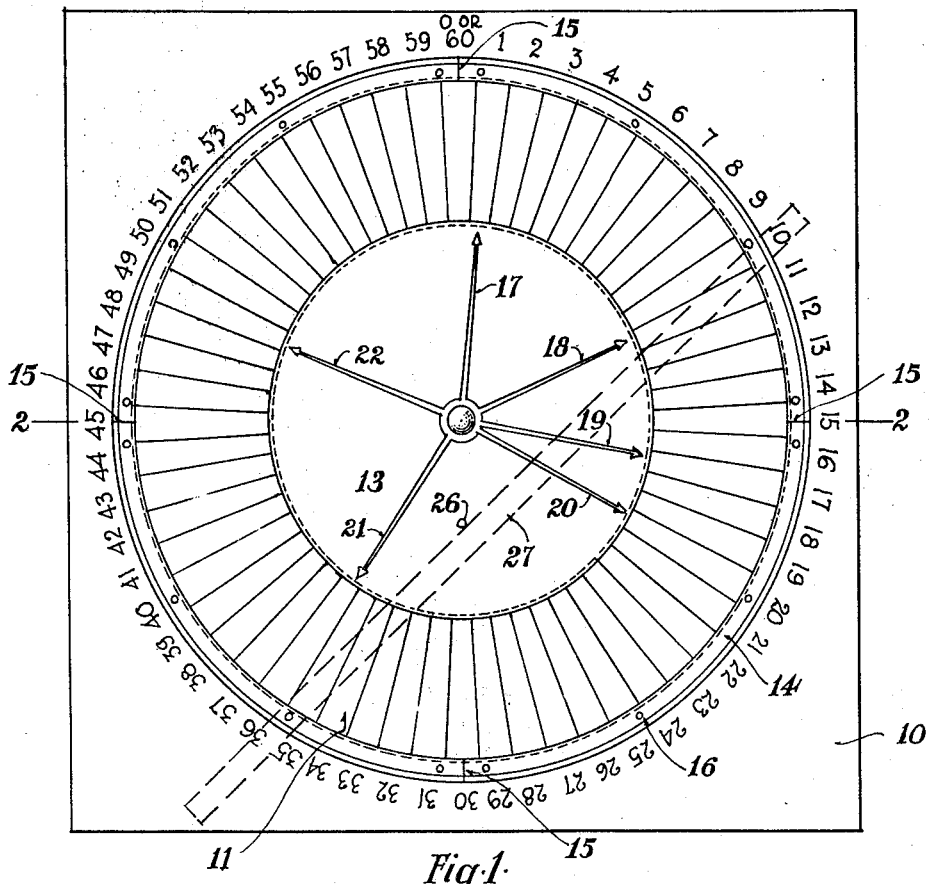
Figure 1 is a plan view of an apparatus for determining color harmonies embodying my invention.
Figure 2:
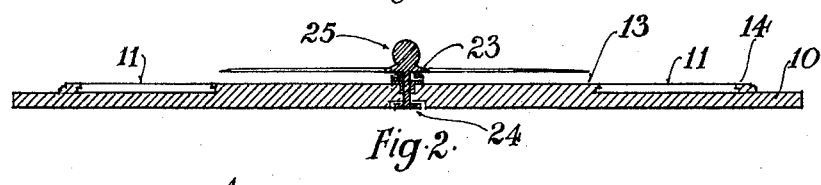
Fig. 2 is a vertical section taken on the line 2—2 of Figure 1.

In the particular drawing selected for more fully disclosing the principle underlying the invention, 10 is a base or support for a surface herein shown as a flat ring composed of a plurality of sectors 11, in the present instance 60 in number, the arcuate ends of said sectors being rabbeted, as indicated at 12, 12 to take into the undercut edge of the central disc-shaped portion 13 of said support and the undercut inner edge of the annular clamp 14 which preferably is divided into four quadrants, as indicated at 15, each quadrant being secured to the support in any suitable manner, as by the screws 16. Mounted for relative movement with respect to said ring is a multi-element indicator of any suitable character, said indicator being shown in the present instance as composed of six arrows 17, 18, 19, 20, 21, 22 radiating from a central boss 23 which is pivotally mounted by the spindle 24 to said support at the center of the ring, a knob 25 being provided for manual manipulation of said indicator.

The consecutive portions into which the flat surface is divided, in the present instance the sectors 11, preferably are numbered consecutively 0 to 60, sector No. 0 coinciding with sector No. 60, as in a watch dial, and such identifying numbers being placed on the underside of the sectors and corresponding numbers imprinted against each sector either on the support adjacent to the annular clamp 14, as shown, or on the central disc 13. Any suitable indicia of light-wave frequency may be used instead of numerals.

It is to be understood that the simple device above described is only one of the many possible embodiments of the present invention and that the drawing is to be considered illustrative merely and not restrictive.

The sectors are shown herein as removable and form with the central portion 13 of the support a disc having its outer peripheral portion divided into a plurality of sectors each of which is provided with a distinctive hue in the manner hereinafter more fully set forth.

In order to make the apparatus more generally useful, certain sectors are given hues that do not appear in the solar spectrum and correspond to the complementaries of the hues in a portion of the visible spectrum.

In one specific embodiment of my invention, sector No. 14 is colored spectrum red, No. 21 spectrum yellow, No. 30 spectrum green, No. 38 spectrum blue and No. 49 spectrum violet. Sectors 11 to 13 are colored with the hues of red immediately preceding spectrum red in the solar spectrum. The sectors between Nos. 15 and 37, inclusive, are colored with the various hues of red, orange, yellow, green and blue which appear in the solar spectrum between spectrum red and spectrum blue. The sectors between Nos. 39 and 49, inclusive, are colored in correspondence with the violet hues of the upper end of the solar spectrum beyond spectrum blue. The sectors from Nos. 50 to 10, inclusive, (proceeding clockwise around the ring) are colored in accordance with hues that do not appear in the solar spectrum and are in the present instance the complementaries of the hues between yellow-green and blue-green, sector No. 50 being the complementary of one of the yellow-greens and sector No. 10 being the complementary of one of the blue-greens.

The circumference of the disc divided into 60 equal arcs, represents a range of light-wave frequencies in which the ratio of the highest to the lowest is 2:1,—for example, sector No. 0, which as above stated is coincident with sector No. 60, may have a hue corresponding to a light wave having a frequency of $4 \times 10^{14}$ and sector No. 60 a hue corresponding to one having a frequency of $8 \times 10^{14}$, said circumference thus constituting a color octave. Each sixtieth part of said circumference therefore represents a proportional change in light wave frequency which is equal to the 60th root of 2, or approximately 1.012,—in other words, the ratio of the frequency of any hue to that of the hue next adjacent thereto in a counterclockwise direction, in the present instance is 1.012, and, in general, is the $m$th root of $n$, where $m$ represents the number of sectors and $n$ is the ratio of the highest frequency in the range to the lowest.

In the particular embodiment of the invention herein illustrated, the small whole-number ratios above-mentioned are 3/2, 4/3, 5/4, 6/5, 7/6, 8/7 and 9/8.

The general rule for determining the hues of the sectors is as follows: I start with the assumption that the circle begins at "60 minutes", or sector No. 0 which, as aforesaid, is coincident with sector No. 60, as in the dial of a watch, that the hue of sector No. 0 which, as above stated, is the complementary of one of the hues of the visible spectrum (spectrum green, in the present instance), has a frequency of $4 \times 10^{14}$ vibrations per second and that the circle ends where it began with a hue having a frequency of $8 \times 10^{14}$ vibrations per second, these two hues being invisible in the solar spectrum, as aforesaid. The complete circle thus represents a "proportional change" in frequency of 2 to 1 which is an octave of frequency, and within this octave lie the visible hues of the spectrum, the frequencies of which we may ascertain from published data.

To determine the hue of any sector, I multiply one-sixtieth of the logarithm of 2, that is to say, log $2^{1/60}$, by the number of the sector and ascertain the number corresponding to this new logarithm. The number so corresponding to said new logarithm is then multiplied by $4 \times 10^{14}$ which is the frequency of the light wave corresponding to sector No. 0, and the product gives the frequency of the light wave corresponding to the sector in question. Knowing the frequency or number of vibrations per second, the hue of the corresponding light wave can be ascertained from published data.

For example, the frequencies of the hues of sectors No. 1, No. 5 and No. 49 are:

Sector No. 1,—$(4 \times 10^{14}) \times \log^{-1}(\log 2^{1/60} \times 1)$

Sector No. 5,—$(4 \times 10^{14}) \times \log^{-1}(\log 2^{1/60} \times 5)$

Sector No. 49,—$(4 \times 10^{14}) \times \log^{-1}(\log 2^{1/60} \times 49)$

Thus it will be seen that the several sectors are arranged in accordance with the logarithms of the proportional changes in frequency of the light waves corresponding to the several hues, the logarithms of such proportional changes being log $2^{1/60}$ multiplied by the number of a sector, and such arrangement of sectors I herein define as being an arrangement in accordance with "a logarithmic function of the frequencies of the light waves corresponding to said hues".

I have stated above how the frequencies of the hues of the sectors from 50 to 10, proceeding clockwise around the disc are ascertained. Definite frequencies can be allocated to the hues in this portion of the disc, according to the law above explained with respect to the hues of the visible spectrum, viz, that the ratio of the frequency of any hue to that next adjacent thereto counterclockwise is the $m$th root of $n$, where $m$ represents the number of sectors employed and $n$ is the ratio of the hightst frequency in the range to the lowest, such ratio in the present case being the sixtieth root of 2, or 1.012.

At certain points on the disc the frequencies of the hues change very rapidly and at these points it is therefore advisable to color one or more sectors with two or more hues representing a proportional change in frequency less than the 60th root of 2. Thus, for example, sector No. 19 which has a hue of orange may be provided with three hues, sector 20 with two hues, sector 22 with three hues and sector 23 with two hues; and sector 37 which is blue-green, may have two hues and sector 38 two hues. In each case the ratio of the frequency of any two consecutive hues in each sector so provided with a plurality of hues will, generally expressed, be the $pm$th root of $n$ where $p$ is a small integral number such, for example, as 2 or 3.

The arrows of the multi-element indicator are related so as to indicate in any given position thereof hues producing a color harmony, and in the particular embodiment of the invention herein specifically described, such relation is angular. Thus, in any position of the indicator, the arrows 17, 18, 20, 21 and 22 will determine a five-color harmony.

The angular positions of the arrows are determined by applying the numbers making up the small whole-number ratios to the respective arrows and finding the number of sectors subtended by the angle between any two arrows. For example, if the number 9 is applied to arrow 18 and the number 8 to arrow 17, the number of sectors subtended by the angle between said arrows is obtained by equating the ratio 9/8 to $2^{1/x}$ where $60/x$ represents the number of sectors subtended by said angle, because the ratio of the frequencies of the light waves corresponding to the hues indicated by said arrows in any position of the indicator must be 9 to 8. Solving $9/8 = 2^{1/x}$, we obtain $x = 6$, approximately, from which it follows that the number of sectors subtended by the angle formed by the arrows 18 and 17, is 60 divided by 6, or 10, and as each sector corresponds to an arc of 6°, said angle is 60°. If the number 9 is applied to arrow 18 and the number 8 to arrow 17, then proceeding counterclockwise around the circle, the number 7 may be applied to arrow 22, the number 6 to arrow 21 and the number 5 to arrow 20, and by the equations $8/7 = 2^{1/x}$, $7/6 = 2^{1/x}$, etc., the angular positions of said arrows in terms of sectors may be determined, and in terms of degrees by multiplying the number of sectors subtended by each angle by 6.

In the present instance where sixty sectors are employed and the small whole-number ratios are as above set forth, the angle between the arrows 18 and 19 is 35°, the angle between the arrows 19 and 20 is 18°, the angle between the arrows 20 and 21 is 97°, the angle between the arrows 21 and 22 is 78°, and the angle between the arrows 22 and 17 is 72°. When the arrows are related in the manner above set forth they will pick out the smallest whole-number ratios.

It is to be understood of course that the number of sectors employed is arbitrarily chosen and that a greater or smaller number may be used, and also that the indicator may have any desired number of arrows. The general rule is that each adjacent pair of arrows forms an angle equal in degrees to $y$ where $y$ is found by $n^{y/360} = a/b$, $n$ is the ratio of the highest frequency in the range to the lowest, as above set forth, and $a$ and $b$ are small integers, $a$ being equal to $b+1$. The angle $y$ is therefore equal to $$360° \left(\frac{\log a/b}{\log n}\right).$$

In some positions the hues indicated by the arrows 18 and 20 may be too close to each other to be of much harmonic value. In such case the arrow 18 may be disregarded and the color indicated thereby omitted from the harmony using either the arrow 20 in conjunction with the arrows 21, 22 and 17 or else the arrow 19 in place of the arrows 18 and 20. The angular relation between arrow 17 and arrow 19 corresponds to the small whole-number ratio 6 to 5.

If a three-color harmony is desired the colors indicated by the arrows 18, 19 and 22, in any given position of the indicator, may be disregarded. If a two-color harmony is desired the colors indicated by all the arrows except 17 and 21 may be omitted.

Figures 3, 4:
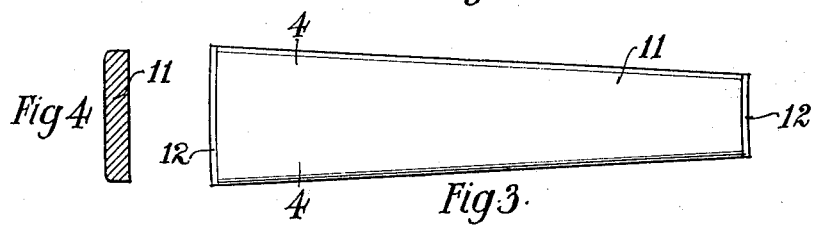
Fig. 3 is a plan view on an enlarged scale of one of the sectors.
Fig. 4 is a vertical section taken on the line 4—4 of Fig. 3.
Figure 5:
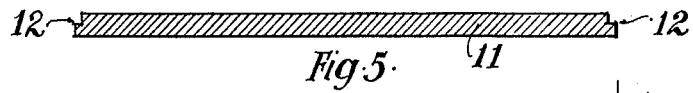
Fig. 5 is a side elevation of the sector shown in Fig. 3.

It is highly desirable that the abutting sides of the sectors be distinctively indicated in order to provide a marked color separation between the hues of the sectors. One way of accomplishing this is indicated in Figs. 3 and 4 and consists in rounding the upper portion of the side walls of the sectors. When this is done the impression received by the eye of the observer is that of a deep shadow between adjacent sectors. Obviously the same result could be accomplished by painting a black line on the upper surface of each sector at the radial boundaries thereof.

It will be obvious that the disc, colored as above described, may be unitary or solid; but it has been found to be convenient to use an annulus made up of sectorial portions, as shown, so that any one of the sectors may be removed and placed close to an article such as a piece of dress-goods, the color scheme of which is to be tested, because more accurate work can be done in that way than by bringing the article itself close to the sector in question when it is in its position as one of the component parts of the ring.

It will be understood also that the coloring of the disc, or the annulus, may be omitted and the color harmonies determined solely by the numbers 1 to 60 and the multi-element indicator, by the simple expedient of making up color cards, each provided with a distinctive hue identified in correspondence with the numbers imprinted on the disc. In such case the member which has the numbers imprinted thereon and is used in conjunction with the multi-element indicator may have any suitable shape and form and may in fact be made of pocket size, as distinguished from the embodiment of the invention herein shown in which the external diameter of the annulus preferably is about four feet.

It will be understood of course that when the coloring of the disc is omitted and numbers or other indicia alone are used to identify the several hues, the numbers or indicia will be spaced apart in accordance with a function of the frequencies of the light waves corresponding to the respective hues represented thereby and preferably in accordance with a logarithmic function of said frequencies.

The proper replacing on the support 10 of sectors that have been removed from the ring to test a color scheme, as above set forth, is facilitated by numbering the sectors and their respective positions in said ring.

Throughout the specification and claims I use the term "hue" as the quality whereby one color is distinguished from another, as a red from a yellow, a green, a blue or a purple.

Located midway between the center of the ring and the inner end of one of the sectors (sector 30 in the illustrated embodiment of the invention) is a pin 26, the purpose of which is to determine a chord of the circle which will intersect complementary colors. When a straight-edge 27 is placed across the ring and against said pin, the upper end of which terminates below the plane of the under side of the indicator, it will connect sectors having complementary colors. In the present instance, said straight-edge connects sector 12 which is colored reddish-purple and sector 35 which has the hue of green complementary to reddish-purple. By this means one may easily determine the hues to be given to sectors 50 to 10, inclusive, proceeding clockwise around the disc.

Figure 6:
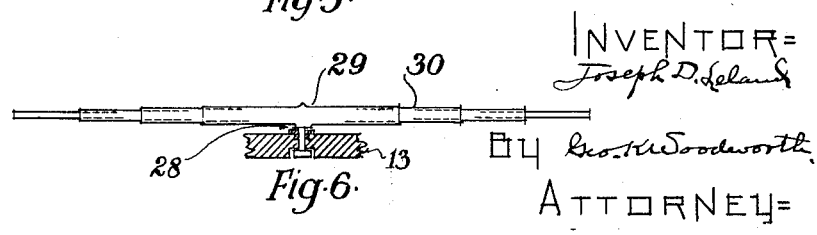
Fig. 6 is an elevation of a modification.

As it is sometimes convenient to incorporate as part of the structure an element for determining complementary colors, I have shown in Fig. 6 a marker or needle pivotally connected to the central portion 13 of the support 10 by the stud 28 which is rotatably mounted in the hole provided for the pin 26. The stud is attached to or formed integral with the sleeve 29 carrying a telescopic marker 30 which when rotated to any position will determine a chord of the disc intersecting two complementary colors.

It will be understood that the particular embodiment of the present invention herein specifically described is subject to a wide range of variation and that many changes may be made in form and shape without departing from the scope of the appended claims.

I claim:

1. Apparatus for determining color harmonies comprising in combination, a ring composed of a plurality of sectors each having a distinctive hue, said hues representing a range of light-wave frequencies in which the ratio of the highest frequency to the lowest is $n$ to 1, where $n$ is a small number not materially less or greater than 2, and said sectors being arranged in such manner that the ratio of the frequencies of the light waves corresponding to two consecutive hues is the $m$th root of $n$ where $m$ represents the total number of said sectors, and a multi-element indicator mounted for relative movement with respect to said disc, each pair of adjacent elements of said indicator forming an angle equal to $$360°\left(\frac{\log a/b}{\log n}\right),$$

where $a$ and $b$ are small integers neither being less than 2, and $a$ being equal to $b+1$.

2. Apparatus for determining color harmonies comprising in combination a surface divided into consecutive portions provided with indicia of light-wave frequencies each corresponding to a distinctive hue, such hues representing a range of light-wave frequencies in which the ratio of the highest frequency to the lowest is $n$ to 1, where $n$ is a small number not materially less or greater than 2, and said indicia being arranged in such manner that the ratios of the frequencies of the light waves represented by two consecutive indicia is the $m$th root of $n$ where $m$ represents the total number of said indicia, and a multi-element indicator mounted for relative movement with respect to said surface, the separation of each pair of adjacent elements of said indicator being proportional to $$360°\left(\frac{\log a/b}{\log n}\right),$$

where $a$ and $b$ are small integers, neither being less than 2 and $a$ being equal to $b+1$.

JOSEPH D. LELAND.